A. WODARRA.
TILTING APPARATUS FOR EMPTYING PORTABLE DUST BINS.
APPLICATION FILED OCT. 27, 1910.

1,021,649.

Patented Mar. 26, 1912.

2 SHEETS—SHEET 1.

Witnesses:
C. Heymann
M. Schmid.

Inventor:
Adolf Wodarra
by B. Singer atty.

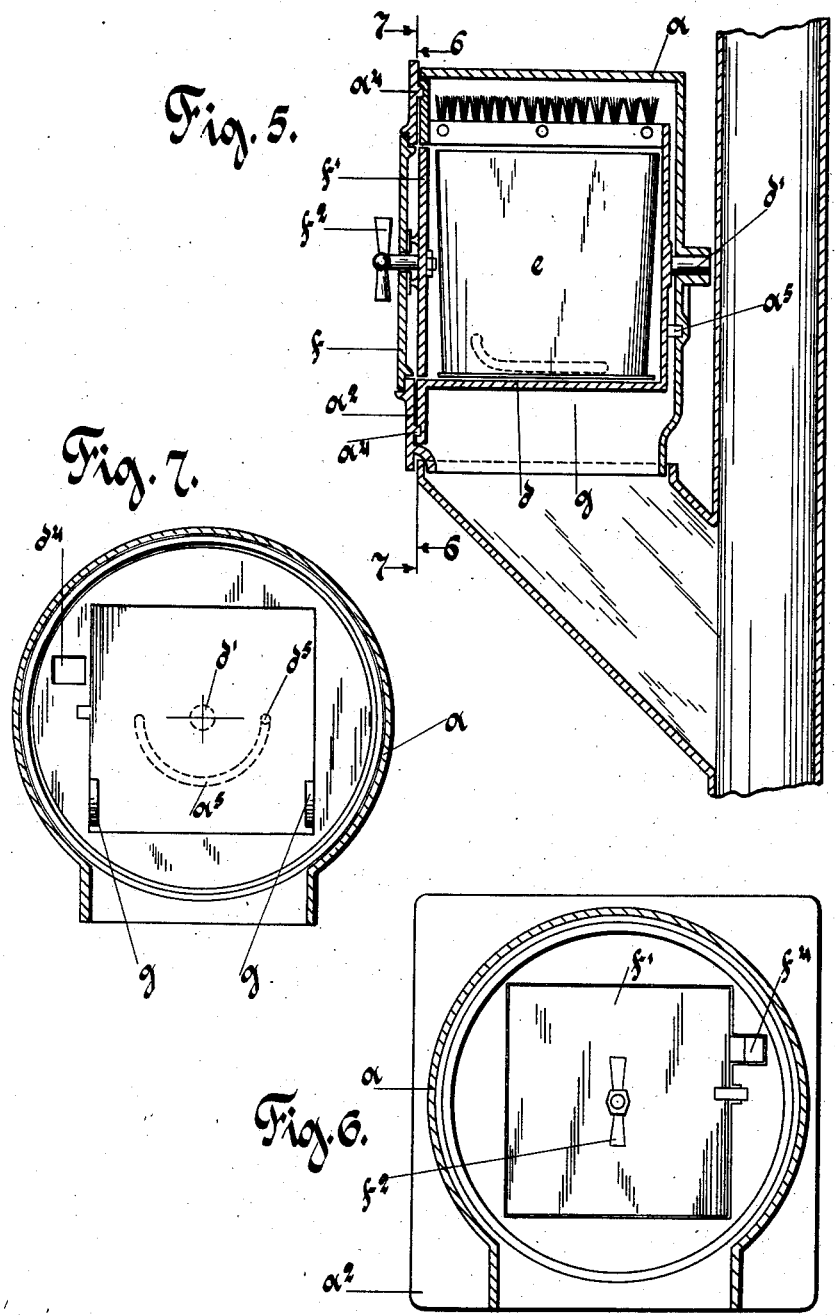

1,021,649.

UNITED STATES PATENT OFFICE.

ADOLF WODARRA, OF FRIEDENAU, NEAR BERLIN, GERMANY.

TILTING APPARATUS FOR EMPTYING PORTABLE DUST-BINS.

1,021,649.  Specification of Letters Patent. Patented Mar. 26, 1912.

Application filed October 27, 1910. Serial No. 589,427.

*To all whom it may concern:*

Be it known that I, ADOLF WODARRA, a subject of the King of Prussia, residing at 32 Schmargendorferstrasse, Friedenau, near Berlin, Germany, have invented certain new and useful Improvements in Tilting Apparatus for Emptying Portable Dust-Bins; and I do hereby declare the following to be a full, clear, and exact description of the invention.

In existing tilting apparatus for emptying portable dust bins, the dust bin is placed in a frame with which it is tilted for the purpose of discharging its contents. Ordinarily the frame and its casing are arranged either in front of a wall, or so, that the frame has to be tilted out of the wall. It has also been proposed to construct the frame as a semicircular pan serving the purpose of the dust bin, mounted in such a manner that the side of the pan-shaped frame will close one side of the dust chute during its tipping movement about its axis parallel to the wall, and will close the dust chute completely on the completion of its tipping movement. Also, in constructions in which a portable dust bin is inserted through the cylindrical side of the tipping frame, and is emptied by being tipped, the frame must be built in front of the wall.

Now my invention has for its object to provide an improved apparatus of the type comprising a tilting frame into which a portable dust bin is placed and emptied by tilting the frame.

According to my invention the tilting frame is built wholly in the wall and does not need to be tilted out of the wall. This advantage is attained by building the frame transversely in the wall, and providing a door in the frame for the introduction of a portable dust bin, preferably in the front of the frame. This construction of the apparatus has the further advantage that it allows of providing in a simple manner a positive connection between the door of the tilting frame and the portable dust bin of such nature that the frame can be tipped only when the portable dust bin is upright.

Two constructions of my improved apparatus are illustrated by way of example in the accompanying drawings in which:—

Figure 1:
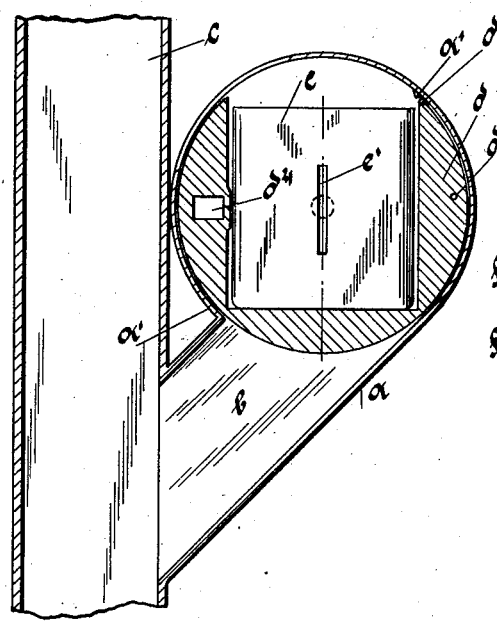
Figure 2:
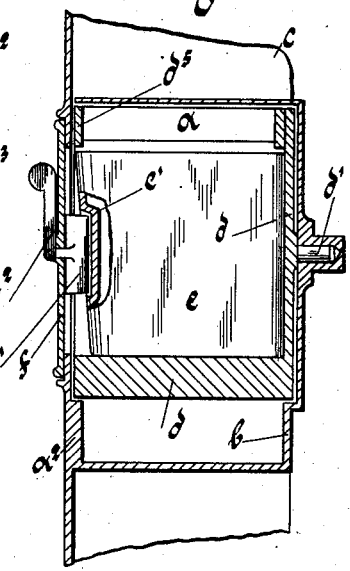
Figure 3:
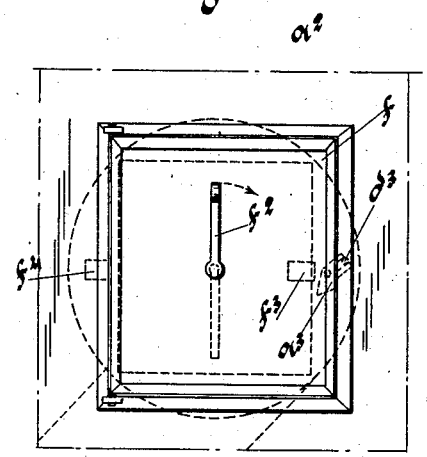

Figures 1 and 2 are vertical sections taken at right angles to each other of one construction. Fig. 3 is an outside elevation and Fig. 4 an inside one of the door in the frame. Fig. 5 is a vertical section of the other construction, and Figs. 6 and 7 are cross-sections respectively on the lines 6—6 and 7—7 of Fig. 5.

$a$ is a casing which is connected in the usual manner by means of an inclined branch chute $b$ to a vertical main dust chute $c$ extending through all the floors or stories of a building.

$d$ is a tilting frame mounted on a pivot $d'$ supported preferably in a ball-bearing in the back wall of the casing $a$. Stops $a'$ against which a pin $d^2$, on the frame $d$ is arranged to strike, serve to limit the extent of the tilting movement of the frame in both directions.

The frame $d$ which is balanced so that it can be tilted with ease, and is made a working fit in the casing $a$, has a cavity for the reception of a portable dust bin $e$ and is open at the top so as to allow the dust to fall out of it in the tilting movement.

The dust bin $e$ is quite smooth all over and is held in the frame $d$ only by projecting fillets $d^5$ or other suitable means.

The frame is arranged to be tilted by means of a lever $f^2$ which is provided on the door $f$ of the frame and is readily accessible from the outside. This lever has an inner arm $f^1$ that engages in a groove $e^1$ in the dust bin $e$.

By turning the lever $f^2$ in the direction of the arrow (Fig. 3) from the position shown in full lines into the position shown in dotted lines, the frame $d$ together with the dust bin $e$, will be tilted so as to empty the latter.

Figure 4:
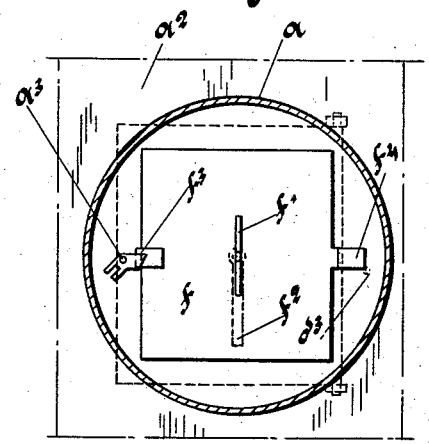

For the purpose of preventing the door $f$ from being opened during the tilting movement, a forked latch $a^3$, Figs. 3 and 4 is pivoted on the inside of the wall $a^2$ of the casing $a$. When the door $f$ is closed, and immediately after the frame has begun to tilt from its upright position into an inverted position, a pin $d^3$ Figs. 1, 3 and 4, on the frame $d$ enters the forked portion of said latch and swings the other end behind a catch $f^3$ on the door $f$, whereby the door is prevented from opening until the frame $d$ has been tilted back into its upright position. Further for the purpose of preventing the frame $d$ from tilting while the door $f$ is open, a recess $d^4$ is formed in the frame $d$ on the side nearest the hinges of the door. When the door is opened a fixed part $f^4$ on the door $f$ engages in the recess $d^4$. It is however to be understood that the safety-locking of the door and the frame may be effected by any other suitable means.

In the construction shown in Figs. 1 to 4, the tilting of the frame with the dust bin therein is effected by means of a driver which is connected to the door handle and which engages in a suitable recess in the dust bin.

Now in the construction shown in Figs. 5 to 7, the driver has the form of a lid which closes completely the opening provided in the tilting frame for the insertion of the dust bin into the latter. In this construction, the driver in its turning movement not only carries the tilting frame around with it, but it also acts as a safety device for preventing the door from being opened when the frame is tilted, and further it closes the opening in the frame whereby a two-fold closure is provided for preventing smells from passing out of the dust chute into the surrounding room.

In the construction shown in Figs. 5 to 7, the casing $a$ is likewise connected to the main dust chute $c$ by an inclined branch dust chute $b$ and the tilting frame is likewise mounted, at one side, on a pivot $d'$ supported in the back wall of the casing.

The portable dust bin $e$ is held in the frame $d$ by suitable means, for instance, by bars $g$ engaging over projections on the bin $e$. In the center of the door $f$ there is pivoted a handle $f^2$, on the pivot of which on the inside a rectangular plate $f'$, is fixed which fits air-tight in the opening in the frame $d$, so as to constitute a lid for this opening when the door $f$ is closed.

When the handle $f^2$ is turned, the corners of the rectangular plate $f'$ engage behind the front wall $a^2$ of the casing $a$, and thereby prevent the door from being opened while the frame $d$ is in a tipped position.

Since the plate $f'$ fills up the opening in the frame $d$, the latter is supported during its tilting movement in front on a bearing formed by the plate $f'$ and the pivot of the handle $f^2$.

For the purpose of making as good an air-tight joint as possible, it is advisable to guide the frame $d$ in the front wall $a^2$ of the casing $a$ by means of a tongue and groove $a^4$, which also constitute a front bearing for the frame $d$.

In order to prevent the frame $d$ from being tilted while the door $f$ is open, a projection $f^4$ is provided on the door, which engages in a recess $d^4$ in the frame $d$ when the door is opened in the same manner as described above. The movement of the frame $d$ is limited by a pin $d^5$ projecting from its rear side, which engages in a semi-circular groove $a^5$ in the rear wall of the casing.

The advantages of the improved apparatus are its simplicity and the absence of all locking bolts, latches, levers or the like, which have been necessary hitherto.

The frame $d$ is preferably made in two halves which may be fastened together by means of bolts with sunk heads and nuts; and it can be easily rendered air-tight by means of jointing strips or the like, so as to prevent all escape of smell. The jointing strips may also be adapted to scrape off any remnants of dirt or refuse adhering to the frame $d$ or its casing $a$, when the frame is being tilted, so that the entire apparatus will always be clean.

I claim:

1. In combination with a dust chute, of a casing delivering thereto, a hinged door for said casing, a rotatable handle for said door, a tiltable refuse support pivoted on one side in said casing and having an opening on the other side, an inner door mounted on said handle and fitting said opening, said casing and support having tongue and groove bearing portions and tongue and groove stop portions 2. In combination with a dust chute, of a casing delivering thereto, a hinged door for said casing, a rotatable handle for said door, a refuse support tiltably mounted on one side in said casing and having an opening on the other side, an inner door mounted on said handle and fitting said opening, said casing and support having tongue and groove portions, substantially as described.

3. In combination with a dust chute, of a casing delivering thereto, a door for said casing, a rotatable handle for said door, a refuse support pivoted on one side in said casing and having an opening on the other side thereof, and an inner door mounted on said handle and fitting said opening, substantially as described.

4. In combination with a dust chute, of a casing delivering thereto and provided with an opening, a refuse support pivoted on one side in said casing and having an opening registering with the opening of said casing, an element fitting the opening in said support, a door for said casing opening, and a rotatable handle in said door connected with said element to tilt said support, substantially as described.

5. In combination with a dust chute, of a casing delivering thereto, a door for said casing, a refuse support in said casing, and pivot devices mounted in said casing and door for tiltably mounting said support in said casing, one of said devices projecting outwardly with respect to said casing, substantially as and for the purposes set forth.

6. In combination with a dust chute, of a casing delivering thereto, a door for said casing, a refuse support in said casing, and rotatable bearing devices in said casing and door for tiltably mounting said support in said casing, the door bearing device projecting outwardly from the door, substantially as and for the purposes set forth.

7. In combination with a dust chute, of a casing delivering thereto, a tiltable refuse support in said casing, and a hinged door for said casing opening to said support, and means movable by said door for locking said support against tilting movement when said door is opened.

In testimony that I claim the foregoing as my invention, I have signed my name in presence of two subscribing witnesses.

ADOLF WODARRA.

Witnesses:
HENRY HASPER,
WOLDEMAR HAUPT.

Copies of this patent may be obtained for five cents each, by addressing the "Commissioner of Patents, Washington, D. C."